(12) United States Patent
Hou et al.

(10) Patent No.: US 11,662,634 B2
(45) Date of Patent: May 30, 2023

(54) TOUCH DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Jingwei Hou, Beijing (CN); Peirong Huo, Beijing (CN); Li Wang, Beijing (CN); Xin Zhao, Beijing (CN); Jingyi Xu, Beijing (CN); Xiaojie Wang, Beijing (CN); Jianyun Xie, Beijing (CN); Wulijibaier Tang, Beijing (CN); Yanhao Sun, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 261 days.

(21) Appl. No.: 17/281,325

(22) PCT Filed: Sep. 28, 2020

(86) PCT No.: PCT/CN2020/118436
§ 371 (c)(1),
(2) Date: Mar. 30, 2021

(87) PCT Pub. No.: WO2021/147367
PCT Pub. Date: Jul. 29, 2021

(65) Prior Publication Data
US 2022/0308410 A1 Sep. 29, 2022

(30) Foreign Application Priority Data
Jan. 21, 2020 (CN) .......................... 202010072504.X

(51) Int. Cl.
*G02F 1/1362* (2006.01)
*G02F 1/133* (2006.01)
(Continued)

(52) U.S. Cl.
CPC .... *G02F 1/136218* (2021.01); *G02F 1/13306* (2013.01); *G02F 1/13338* (2013.01);
(Continued)

(58) Field of Classification Search
CPC ........... G02F 1/136218; G02F 1/13306; G02F 1/13338; G02F 1/13439; G02F 1/1368; G06F 3/0412; G06F 3/044; G06F 3/045
(Continued)

(56) References Cited

U.S. PATENT DOCUMENTS

2016/0291754 A1  10/2016  Jin
2017/0038903 A1  2/2017  Sun et al.
(Continued)

FOREIGN PATENT DOCUMENTS

CN  104777681 A  7/2015
CN  205193765 U  4/2016
(Continued)

OTHER PUBLICATIONS

Office Action for corresponding Chinese Application No. 202010072504.X dated Feb. 9, 2021.

*Primary Examiner* — Charles S Chang
(74) *Attorney, Agent, or Firm* — ArentFox Schiff LLP; Michael Fainberg

(57) ABSTRACT

The application discloses a touch display device, including a liquid crystal display panel, a touch electrode, and a backlight module on a light incident side of the liquid crystal display panel. The backlight module includes a metal back plate. The touch display device further includes a shielding electrode on a side of the touch electrodes facing the
(Continued)

backlight module, both the shielding electrode and the metal back plate are grounded. The touch electrode and the shielding electrode form a capacitor, and the product of a capacitance value of the capacitor and a resistance value of the shielding electrode is smaller than a pulse width of touch signals applied to the touch electrodes.

14 Claims, 10 Drawing Sheets

(51) Int. Cl.

| | | |
|---|---|---|
| *G02F 1/1333* | (2006.01) | |
| *G06F 3/041* | (2006.01) | |
| *G02F 1/1335* | (2006.01) | |
| *G06F 3/044* | (2006.01) | |
| *G06F 3/045* | (2006.01) | |
| *G02F 1/1343* | (2006.01) | |
| *G02F 1/1368* | (2006.01) | |

(52) U.S. Cl.
CPC .. *G02F 1/133512* (2013.01); *G02F 1/133514* (2013.01); *G06F 3/044* (2013.01); *G06F 3/045* (2013.01); *G06F 3/0412* (2013.01); *G02F 1/1368* (2013.01); *G02F 1/13439* (2013.01); *G06F 2203/04107* (2013.01)

(58) Field of Classification Search
USPC ...................................................... 349/12, 40
See application file for complete search history.

(56) References Cited

U.S. PATENT DOCUMENTS

| | | |
|---|---|---|
| 2017/0212635 A1 | 7/2017 | Cordeiro et al. |
| 2017/0277329 A1 | 9/2017 | Ding et al. |
| 2017/0285832 A1 | 10/2017 | Lee et al. |
| 2018/0039356 A1* | 2/2018 | Kurasawa ......... G06F 3/041662 |
| 2018/0113343 A1 | 4/2018 | Huang et al. |
| 2018/0231853 A1 | 8/2018 | Yamamoto et al. |
| 2019/0369791 A1 | 12/2019 | Cooke |
| 2021/0333976 A1* | 10/2021 | Huang .............. G02F 1/133514 |

FOREIGN PATENT DOCUMENTS

| | | |
|---|---|---|
| CN | 105676509 A | 6/2016 |
| CN | 106293212 A | 1/2017 |
| CN | 106575183 A | 4/2017 |
| CN | 106610745 A | 5/2017 |
| CN | 106775055 A | 5/2017 |
| CN | 107272939 A | 10/2017 |
| CN | 110471558 A | 11/2019 |
| CN | 111258457 A | 6/2020 |
| JP | 2019087060 | 6/2019 |
| KR | 20140098571 A | 8/2014 |
| KR | 20190080563 A | 7/2019 |

* cited by examiner

TOUCH DISPLAY DEVICE

CROSS REFERENCE TO RELATED APPLICATION

This application is a national phase entry under 35 U.S.C. § 371 of International Application No. PCT/CN2020/118436, filed on Sep. 28, 2020, which claims priority of the Chinese Patent Application No. 202010072504.X, filed with the China National Intellectual Property Administration on Jan. 21, 2020 and entitled "Touch Display Device", which is hereby incorporated by reference in its entirety.

FIELD

The application relates to the field of display technology, in particular, to a touch display device.

BACKGROUND

A touch display device combines touch electrodes with a display panel to create a touch display. At present, touch technology is very widely used in liquid crystal display devices. A liquid crystal display device includes a liquid crystal display panel and a backlight module, where the backlight module is mainly composed of a backlight source and a metal back plate. To eliminate the static electricity formed on the surface of the metal back plate, the metal back plate is grounded. While periodic high-frequency rectangular pulse signals are applied to touch electrodes combined with the liquid crystal display device, such that capacitance is formed between the touch electrodes and the metal back plate. Since the pulse signals on the touch electrodes are generated by alternating positive and negative voltages, an electric field formed between the touch electrodes and the metal back plate induce positive or negative charges, causing an electrostriction effect in a dielectric material film layer between the touch electrodes and the metal back plate, which results in elastic deformation and causes vibration. When the human ear is close, sound caused by the vibration of the film layer may be heard clearly. This phenomenon is defined as screen squeal. The screen squeal phenomenon influences the use effect of a product.

SUMMARY

In view of this, embodiments of the application provide a touch display device, a specific solution of which is as follows.

A touch display device provided in embodiments of the application includes a liquid crystal display panel, a touch electrode, and a backlight module on a light incident side of the liquid crystal display panel. The backlight module includes a metal back plate. The touch display device further includes a shielding electrode on a side of the touch electrode facing the backlight module, both the shielding electrode and the metal back plate are grounded. The touch electrode and the shielding electrode form a capacitor, and the product of a capacitance value of the capacitor and a resistance value of the shielding electrode is smaller than a pulse width of touch signals applied to the touch electrodes.

In some embodiments, in the touch display device provided in the embodiment of the application, the product of the capacitance value of the capacitor and the resistance value of the shielding electrode is of an order of magnitude smaller than that of the pulse width of the touch signals.

In some embodiments, in the touch display device provided in the embodiment of the application, the liquid crystal display panel includes: a first substrate and a second substrate disposed opposite to each other, and a liquid crystal layer between the first substrate and the second substrate. The backlight module is located on a side of the first substrate away from the second substrate. The touch electrode is located between the first substrate and the second substrate, or on a side of the second substrate away from the liquid crystal layer. The shielding electrode is located on a side of the first substrate facing the liquid crystal layer, or the shielding electrode is located on a side of the first substrate away from the liquid crystal layer.

In some embodiments, in the touch display device provided in the embodiment of the application, the liquid crystal display panel further includes: a thin film transistor array film layer on the side of the first substrate facing the liquid crystal layer, and a first polarizer on the side of the first substrate away from the liquid crystal layer. The shielding electrode is located between the first substrate and the thin film transistor array film layer, or the shielding electrode is located between the first substrate and the first polarizer.

In some embodiments, in the touch display device provided in the embodiment of the application, the shielding electrode is made of a metal or transparent conductive material.

In some embodiments, in the touch display device provided in the embodiment of the application, the first substrate has a display area and a bezel area surrounding the display area, the shielding electrode being located in the display area, and the shielding electrode being of a grid structure.

In some embodiments, in the touch display device provided in the embodiment of the application, the liquid crystal display panel further includes a black matrix between the first substrate and the second substrate; and an orthographic projection of the shielding electrode on the first substrate is located within an orthographic projection of the black matrix on the first substrate.

In some embodiments, in the touch display device provided in the embodiment of the application, the first substrate has a display area and a non-display area surrounding the display area, the shielding electrode being located in the non-display area and surrounding the display area.

In some embodiments, in the touch display device provided in the embodiment of the application, the shielding electrode is made of a transparent conductive material, and an orthographic projection of the shielding electrode on the first substrate covers the first substrate.

In some embodiments, the touch display device provided in the embodiment of the application further includes: a driver chip, a flexible circuit board, and a printed circuit board. The driver chip is located on the first substrate or on the flexible circuit board. The printed circuit board is located on a side of the metal back plate away from the liquid crystal display panel. The printed circuit board is electrically connected to the liquid crystal display panel through the flexible circuit board. The metal back plate is electrically connected to a ground terminal on the printed circuit board.

In some embodiments, in the touch display device provided in the embodiment of the application, the shielding electrode is located between the first substrate and the thin film transistor array film layer, and the shielding electrode is electrically connected to the ground terminal on the flexible circuit board.

In some embodiments, in the touch display device provided in the embodiment of the application, the shielding electrode is located between the first substrate and the first polarizer, and the shielding electrode is grounded by being electrically connected to the metal back plate.

In some embodiments, in the touch display device provided in the embodiment of the application, the backlight module further includes a backlight source on a side of the metal back plate facing the liquid crystal display panel, a conductive pad, and a flexible conductive light shielding adhesive. The metal back plate supports the backlight source. The conductive pad is located between the backlight source and the shielding electrode and in direct contact with the shielding electrode. An orthographic projection of the conductive pad on the first substrate is located in a bezel area of the first substrate; and two ends of the flexible conductive tape are in direct contact with the conductive pad and the metal back plate, respectively.

DETAILED DESCRIPTION OF THE EMBODIMENTS

Figure 1:
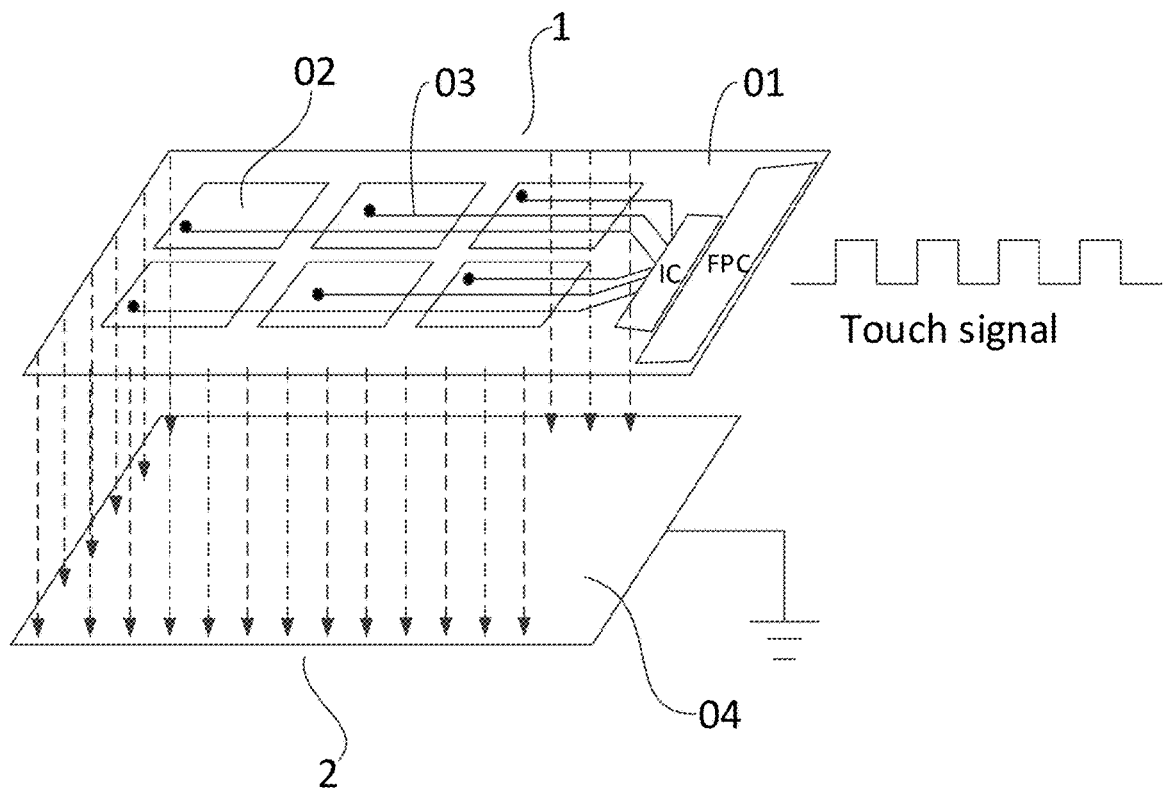
FIG. 1 is a schematic structural diagram of one of liquid crystal touch display devices in the related art.

For the touch function of a touch product, an IC needs to output a modulation signal (a high-frequency square wave signal) to a touch electrode. For a liquid crystal touch display device, as shown in FIG. 1, the liquid crystal touch display device includes a liquid crystal display panel 1 and a backlight module 2 on a light incident side of the liquid crystal display panel 1. The liquid crystal display panel 1 includes an array substrate 01, touch electrodes 02 integrated in the liquid crystal display panel 1, and leads 03 electrically connected to the touch electrodes 02. The leads 03 are electrically connected to an IC, the IC is electrically connected to a flexible circuit board (FPC), the touch electrodes 02 is electrically connected to a touch signal input terminal, and high-frequency rectangular pulse signals are applied to the touch electrodes 02 through the IC. The backlight module 2 includes a metal back plate 04, the metal back plate 04 being grounded. That is, when the product is manufactured to form a module, after the metal back plate 04 is assembled, the metal back plate 04 and the touch electrodes 02 form a capacitor. After high-frequency rectangular pulse signals are applied to two ends of the capacitor, a dielectric material film layer between the touch electrodes 02 and the metal back plate 04 undergoes electrostriction, i.e. an inverse piezoelectric effect. Thus, when the touch signals are applied to the touch electrodes 02, under the action of an AC electric field, induced charges are generated under an electric field (denoted by dashed arrows) formed between the touch electrodes 02 and the metal back plate 04, causing an electrostriction effect in the dielectric material film layer between the touch electrodes 02 and the metal back plate 04, which results in elastic deformation and causes vibration. When the human ear is close, sound caused by the vibration of the film layer may be heard clearly, that is, a screaming problem occurs, which affects the normal use by users or degrades the use experience of uses, and has become a big problem for mobile phone products in the industry.

In view of this, embodiments of the application provide a touch display device to solve the screaming problem in a mobile phone.

To make the above objectives, features and advantages of the application more obvious and understandable, the application will be further described below in conjunction with the accompanying drawings and embodiments. However, the exemplary embodiments may be implemented in various forms, and should not be construed as limited to the embodiments set forth herein; instead, these embodiments are provided to make the application more comprehensive and complete, and fully convey the concept of the exemplary embodiments to those skilled in the art. Same reference numerals in the drawings denote same or similar structures, and thus repeated description thereof will be omitted. Words expressing positions and directions in the application use the drawings as examples for description, but changes may be made as needed, and the changes are encompassed within the protection scope of the application. The drawings of the application are only used for illustrating relative positional relationships, and do not represent the true scales.

It is to be noted that specific details are set forth in the following description to fully understand the application. However, the application can be implemented in many other ways different from those described herein, and those skilled in the art can make similar generalizations without departing from connotations of the application. Therefore, the application is not limited by the specific embodiments disclosed below. The subsequent description of the specification involves preferred embodiments for implementing the application, but the description is for the purpose of illustrating general principles of the application and is not intended to limit the scope of the application. The protection scope of the application shall be defined by the appended claims.

A touch display device provided in embodiments of the application will be described specifically below in conjunction with the drawings.

Figure 2:
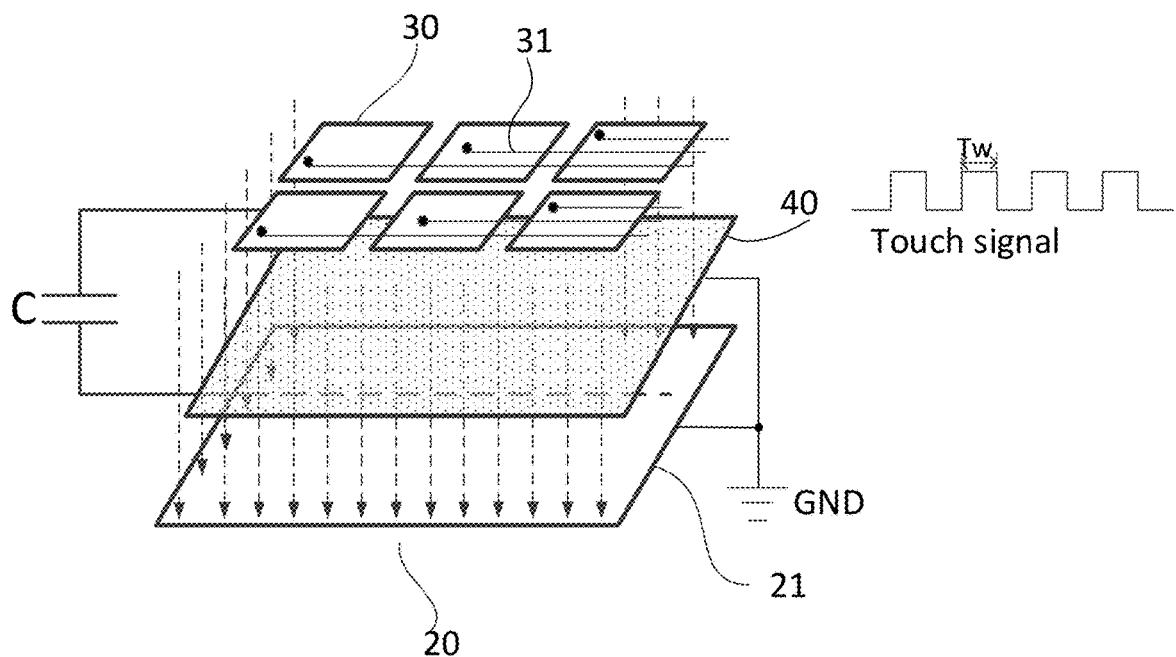
FIG. 2 is a structural diagram of a first touch display device provided in embodiments of the application.

A touch display device provided in embodiments of the application, as shown in FIG. 2, includes a liquid crystal display panel (not shown in FIG. 2), touch electrodes 30, and a backlight module 20 on a light incident side of the liquid crystal display panel, the backlight module 20 including a metal back plate 21;

the touch display device further includes a shielding electrode 40 on a side of the touch electrodes 30 facing the backlight module 20, both the shielding electrode 40 and the metal back plate 21 being grounded (GND); and the touch electrodes 30 and the shielding electrode 40 form a capacitor C, and the product of a capacitance value of the capacitor C and a resistance value of the shielding electrode 40 is smaller than a pulse width Tw of touch signals applied to the touch electrodes 30.

Figure 3:
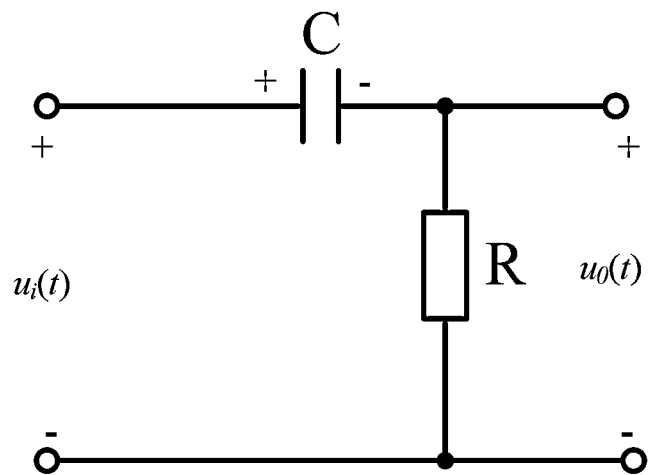
FIG. 3 is a schematic diagram of an RC differential circuit.

In the above-mentioned touch display device provided in the embodiment of the application, the shielding electrode is provided on the side of the touch electrodes facing the backlight module, and the shielding electrode is grounded, such that the touch electrodes and the shielding electrode form a capacitor, and the capacitor and the shielding electrode form a series structure of the capacitor C and a resistor R, where the product of a capacitance value of the capacitor C and a resistance value of the shielding electrode 40 is smaller than a pulse width Tw of touch signals applied to the touch electrodes 30, such that the series structure of the capacitor C and the resistor R forms an RC differential circuit shown in FIG. 3, where ui(t) represents an input voltage, and u0(t) represents an output voltage. The RC differential circuit can be used to convert the rectangular pulse signals into spike pulse signals, thereby changing the form of the electric field between the shielding electrode and the metal back plate. As such, polarization is not liable to occur in a dielectric material film layer between the shielding electrode and the metal backing plate in a constantly changing direction of the electric field, an electrostriction condition is not met, mechanical vibration cannot be achieved, and thus the screaming problem can be effectively improved.

In some embodiments, in the application, the product RC of the capacitance value of the capacitor and the resistance value of the shielding electrode represents a time constant of the RC differential circuit, where the unit of capacitance is F (Farad), the unit of resistance is Ω (ohm), and the unit of the time constant is s (second).

Figure 4A:
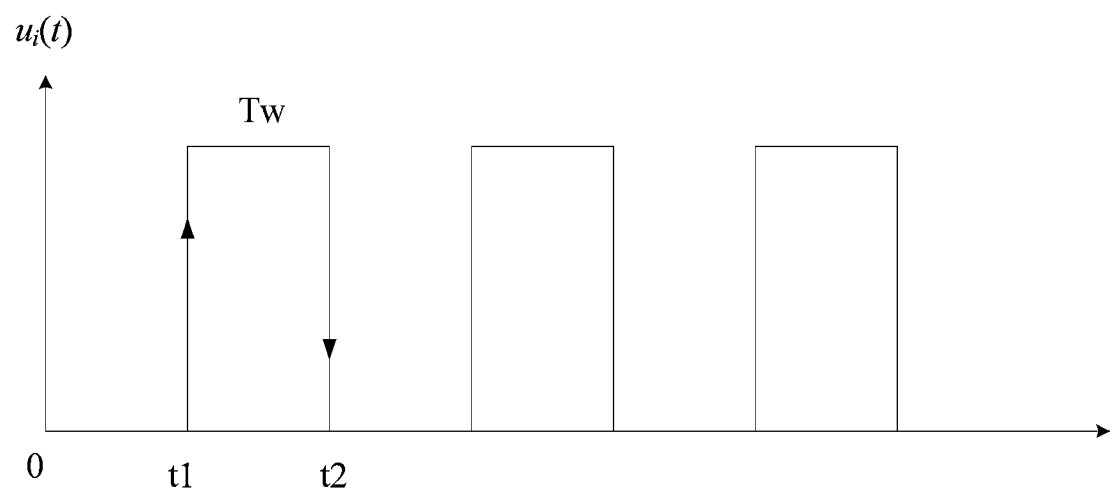
FIG. 4A is a waveform diagram of input signals of the RC differential circuit shown in FIG. 3.
Figure 4B:
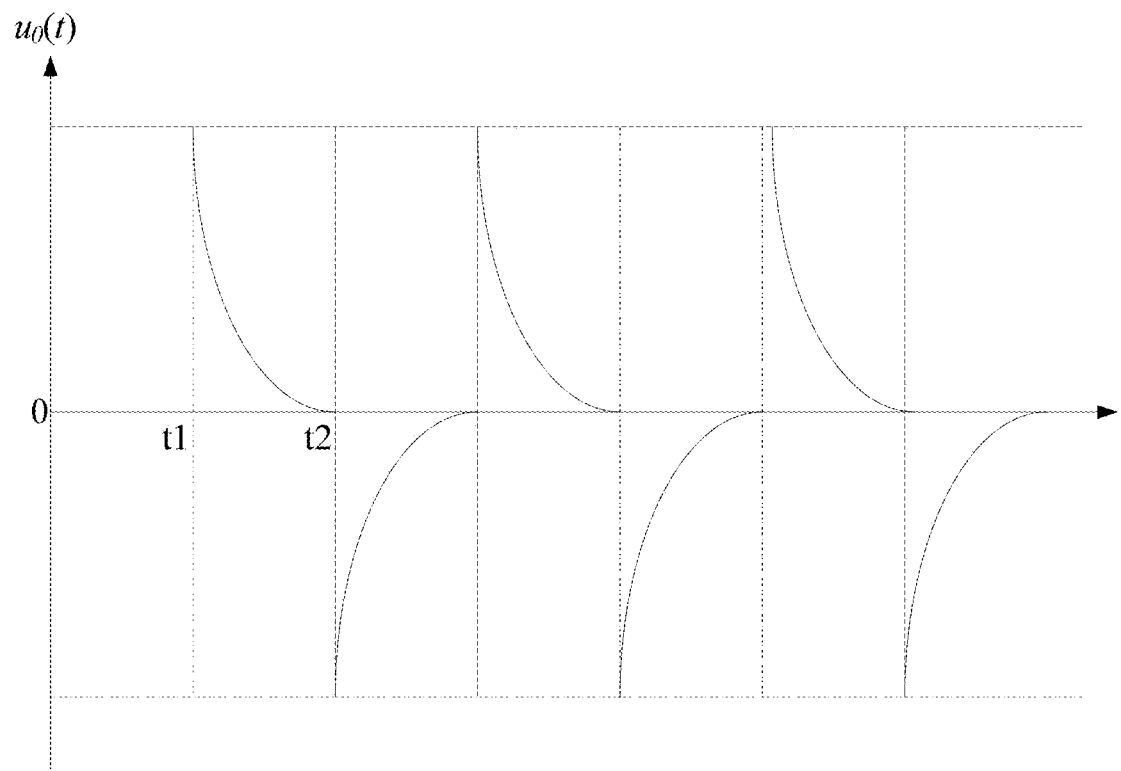
FIG. 4B is a waveform diagram of output signals of the RC differential circuit shown in FIG. 3.

In some embodiments, as shown in FIGS. 4A and 4B, when the touch electrodes operate, the touch signals applied to the touch electrodes are rectangular pulse signals, and are at a high level at t1 and are off (relatively low-level) at t2, and a time interval between t1 and t2 is the pulse width Tw. At time t1, the touch electrodes change from a low level to a high level. Since the voltage across the capacitor C cannot change abruptly, the voltage ui(t) is all across the resistor R at this time. Then the capacitor C is gradually charged, the voltage across the capacitor C increases exponentially, and the output voltage u0(t) on the resistor R decreases exponentially. The smaller the resistance R of the shielding electrode, the smaller the RC, and the faster the charging process. At t2, the touch electrodes change from a high level to a low level, the capacitor C starts to discharge gradually, and the voltage across the capacitor C decreases exponentially. At this time, the capacitor C undergoes reverse charging through the resistor R, and the output voltage u0(t) (a negative voltage) on the resistor R increases exponentially. After certain time, discharging of the capacitor C is completed, and the output voltage u0(t) on the resistor R becomes 0. The smaller the resistance of the shielding electrode, the smaller the RC, and the faster the discharging process.

In some embodiments, if the pulse width Tw of the touch signals is relatively small, the capacitor C is discharged while being not fully charged, or it is charged when it is not fully discharged, and an output waveform is not an ideal spike pulse wave. Therefore, to convert the touch signals on the touch electrodes into spike pulse signals by an RC differential circuit, the width of the spike pulse signals is related to RC (i.e. the time constant of the circuit). The smaller the RC, the sharper the spike pulse signals; and the smaller the RC, the wider the spike pulse signals. To implement the RC differential circuit, RC must be smaller than the width of an input waveform, otherwise it loses the waveform transforming function and becomes a general RC coupling circuit. The application uses the RC differential circuit to convert the rectangular pulse signals of a same direction on the touch electrodes into spike pulse signals of positive and negative directions on the shielding electrode, thereby changing the form of the electric field between the shielding electrode and the metal back plate, such that equal amounts of positive and negative charges are induced between the shielding electrode and the metal back plate, and the positive and negative charges neutralize, so the charges induced by the electric field become 0. In this way, polarization is not liable to occur in the dielectric material film layer between the shielding electrode and the metal backing plate, an electrostriction condition is not met, mechanical vibration cannot be achieved, and thus the screaming problem can be effectively improved.

In some embodiments, the product of the capacitance value of the capacitor and the resistance value of the shielding electrode may be RC=1/10Tw. For example, if the pulse width Tw of the touch signals applied to the touch electrodes is between 100 µs and 200 µs, then the product RC of the capacitance value of the capacitor and the resistance value of the shielding electrode may be set to be between 10 µs and 20 µs, which is not limited here.

Figure 5:
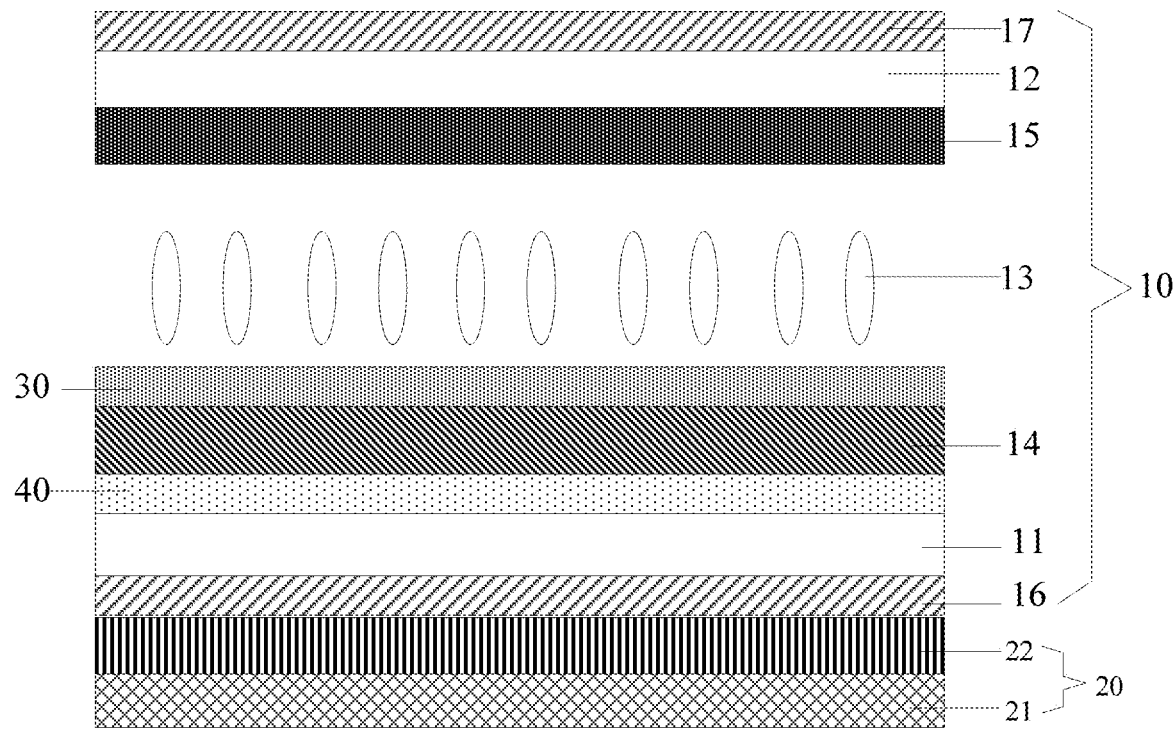
FIG. 5 is a structural diagram of a second touch display device provided in embodiments of the application.
Figure 6:
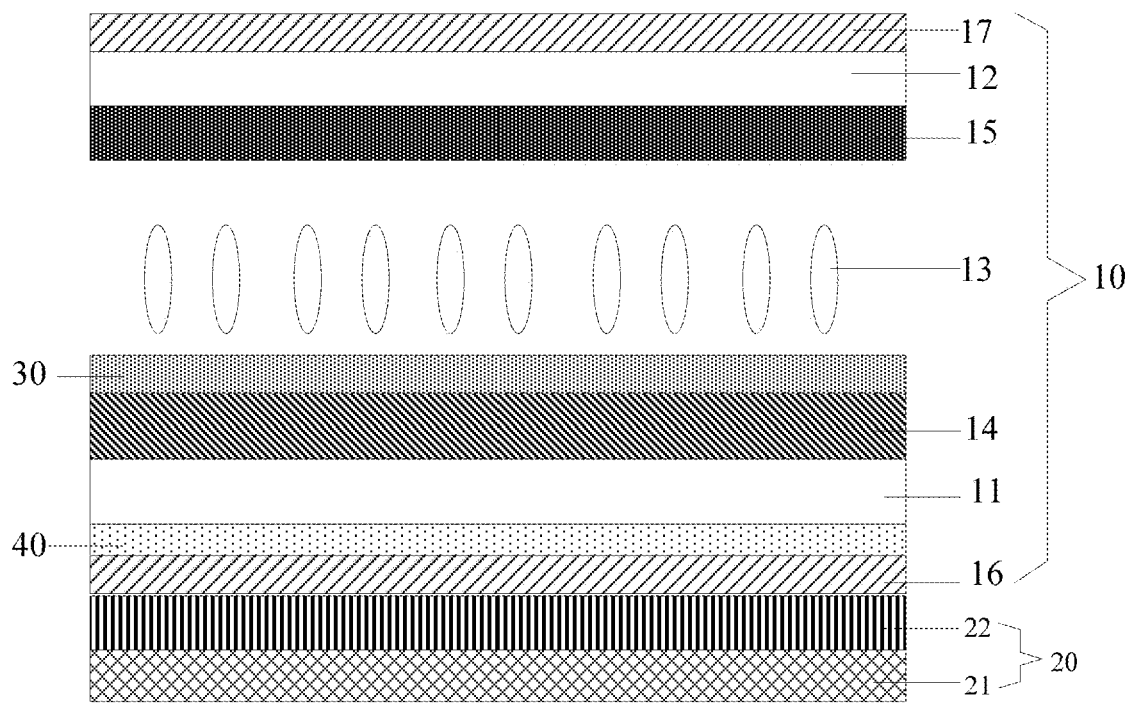
FIG. 6 is a structural diagram of a third touch display device provided in embodiments of the application.

In some embodiments, in the application, as shown in FIGS. 5 and 6, the backlight module 20 generally further includes a backlight source 22 on a side of the metal back plate 21 facing the liquid crystal display panel 10, and the metal back plate 21 is used to support the backlight source 22. Further, the metal back plate 21 is generally formed of iron, and the metal back plate 21 is grounded to eliminate static electricity formed on the surface of the metal back plate 21.

In some embodiments, based on the pulse widths Tw of different touch signals applied correspondingly to touch electrodes for liquid crystal product models at present, shielding electrodes with different resistance values may be connected in series thereto to form a RC differential circuit in each case to ensure that the capacitor C formed by the shielding electrode and the touch electrodes satisfies a relationship with the RC differential circuit. To satisfy RC≪Tw, the product of the capacitance value of the capacitor C and the resistance value of the resistor R may be in the order of magnitude smaller than that of the pulse width Tw of the touch signals, to achieve the waveform transforming function of the RC differential circuit. Generally, RC is less than or equal to 1/10 of the pulse width Tw of the touch signals to meet the requirement.

In the touch display device provided by the application, as shown in FIGS. 5 and 6, the liquid crystal display panel 10 includes: a first substrate 11 and a second substrate 12 disposed opposite to each other, and a liquid crystal layer 13 between the first substrate 11 and the second substrate 12, and the backlight module 20 is arranged on a side of the first substrate 11 away from the second substrate 12.

The touch display device provided in the embodiment of the application may be applied to an Add on Mode Touch Panel, an On Cell Touch Panel, or an In Cell Touch Panel, which is not limited here.

In some embodiments, for the Add on Mode Touch Panel, the touch electrodes and the liquid crystal display panel are manufactured separately, and then the touch electrodes are fit to a light emergent side of the liquid crystal display panel. In the On Cell Touch Panel, the touch electrodes are directly formed on a light emergent side of the liquid crystal display panel. In the two types of touch screens, the touch electrodes are located on the side of the second substrate away from the liquid crystal layer, the distance between the touch electrodes and the metal back plate being relatively large, and the capacitance formed by the touch electrodes and the metal back plate being small, so there is no obvious screaming phenomenon, and the screaming phenomenon, if any, can be solved by the application.

In the In Cell Touch Panel, the touch electrodes are embedded in the liquid crystal display panel, and the touch electrodes are located between the first substrate and the second substrate, the distance between the touch electrodes and the metal back plate being relatively small, and the capacitance formed by the touch electrodes and the metal back plate being large, so a screaming phenomenon is very liable to occur, and thus the touch display device provided by the application is especially suitable for the in cell touch panel.

In the application, as shown in FIG. 5, the shielding electrode 40 may be provided on a side of the first substrate 11 facing the liquid crystal layer 13, or as shown in FIG. 6, the shielding electrode 40 is provided on a side of the first substrate 11 away from the liquid crystal layer 13. The RC differential circuit formed by the touch electrodes 30 and the shielding electrode 40 is used to convert the rectangular pulse signals of a same direction on the touch electrodes 30 into spike pulse signals of positive and negative directions on the shielding electrode 40, thereby changing the form of the electric field between the shielding electrode 40 and the metal back plate 21, such that equal amounts of positive and negative charges are induced between the shielding electrode 40 and the metal back plate 21, and the positive and negative charges neutralize, so the charges induced by the electric field become 0. In this way, polarization is not liable to occur in the dielectric material film layer between the shielding electrode 40 and the metal backing plate 21, an electrostriction condition is not met, mechanical vibration cannot be achieved, and thus the screaming problem can be effectively improved.

In the touch display device provided by the application, as shown in FIGS. 5 and 6, the liquid crystal display panel generally further includes a thin film transistor array film layer 14, pixel electrodes (not shown in the figure), common electrodes (not shown in the figure), a color filter layer 15, a black matrix (not shown in the figure), a first polarizer 16 and a second polarizer 17. The thin film transistor array film layer 14 and the pixel electrodes are generally both provided between the first substrate 11 and the liquid crystal layer 13; the common electrodes, the color filter layer 15 and the black matrix may be provided between the first substrate 11 and the liquid crystal layer 13 or between the second substrate 12 and the liquid crystal layer 13. The first polarizer 16 is provided on the side of the first substrate 11 away from the liquid crystal layer 13. The second polarizer 17 is provided on a side of the second substrate 12 away from the liquid crystal layer 13.

In some embodiments, the thin film transistor array film layer generally includes an active layer, a gate insulating layer, a gate layer, an interlayer dielectric layer, a source-drain electrode layer provided in a same layer, and a planarization layer. Thin film transistors in the thin film transistor array film layer may have a top gate structure or a bottom gate structure, which is not limited here. The color filter layer at least includes red, green, and blue color resist units arranged in an array, and the black matrix is arranged between adjacent color resist units.

The touch display device of the application will be described in detail below by applying to an in cell touch panel as an example.

In some embodiments, as shown in FIGS. 5 and 6, the touch electrodes 30 may be located between the first substrate 11 and the liquid crystal layer 13. Of course, the touch electrodes may also be located between the second substrate and the liquid crystal layer, which is not limited here.

Further, the touch electrodes 30 may be an electrode layer provided separately on the basis of the liquid crystal display panel, or the common electrodes or the pixel electrodes in the liquid crystal display panel 10 may be multiplexed as the touch electrodes, which is not limited here.

Further, the touch display panel provided by the application, as shown in FIG. 2, further includes leads 31 connected to the touch electrodes 30 to apply touch signals to the touch electrodes 30 through the leads 31.

In some embodiments, in the touch display device provided by the application, as shown in FIG. 5, the shielding electrode 40 is located between the first substrate 11 and the thin film transistor array film layer 14. Alternatively, as shown in FIG. 6, the shielding electrode 40 is located between the first substrate 11 and the first polarizer 16. That is, the shielding electrode 40 is directly provided on the first substrate, which does not affect the fabrication of other functional film layers in the liquid crystal display panel 10, and thus does not cause defects in the liquid crystal display panel 10.

In the touch display device provided by the application, the shielding electrode may be made of a metal material, such as Al or Mg, or a transparent conductive material, such as ITO, which is not limited here.

Figure 7:
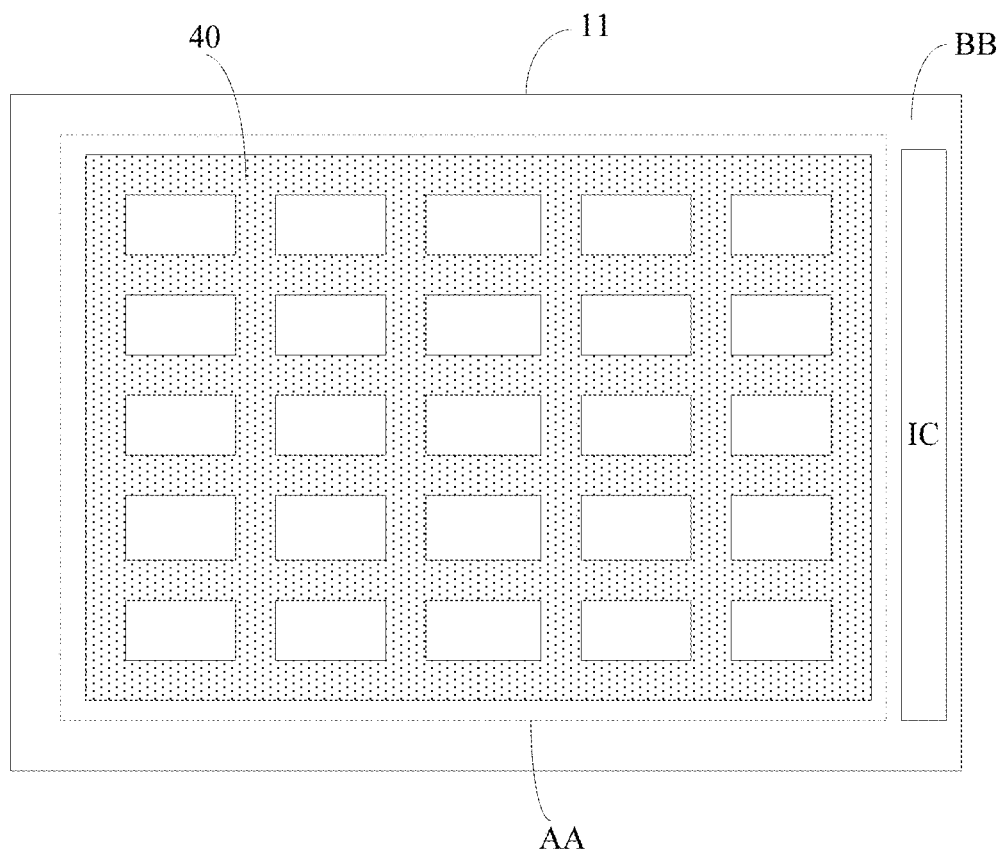
FIG. 7 is a structural diagram of a first shielding electrode in a touch display device provided in embodiments of the application.
Figure 8:
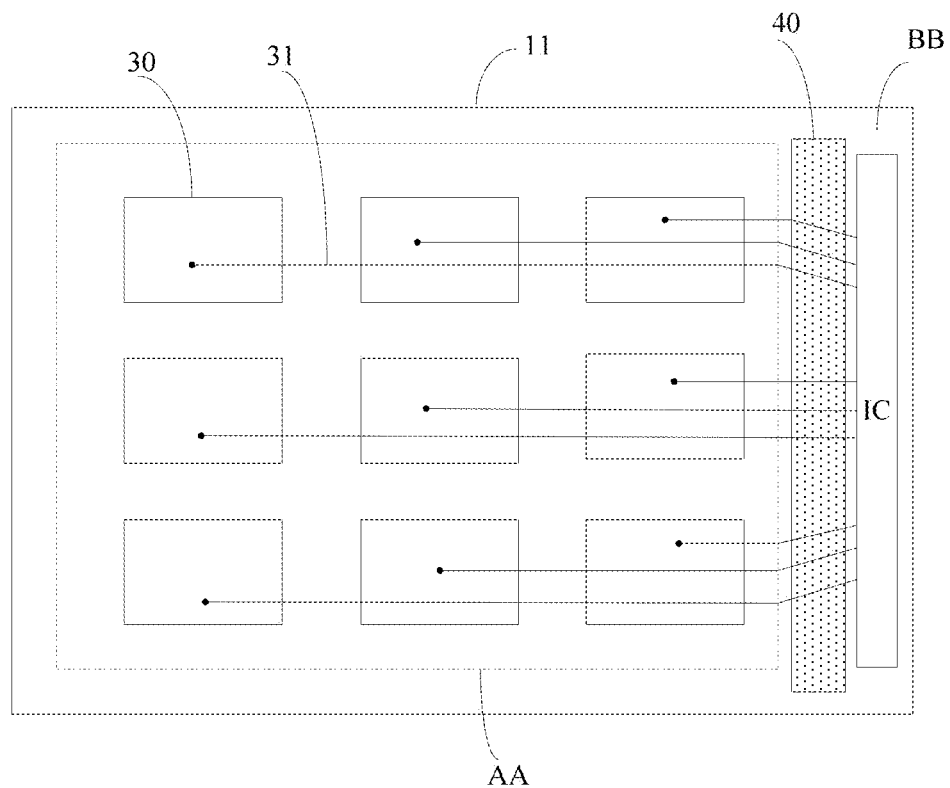
FIG. 8 is a structural diagram of a second shielding electrode in a touch display device provided in embodiments of the application.
Figure 9:
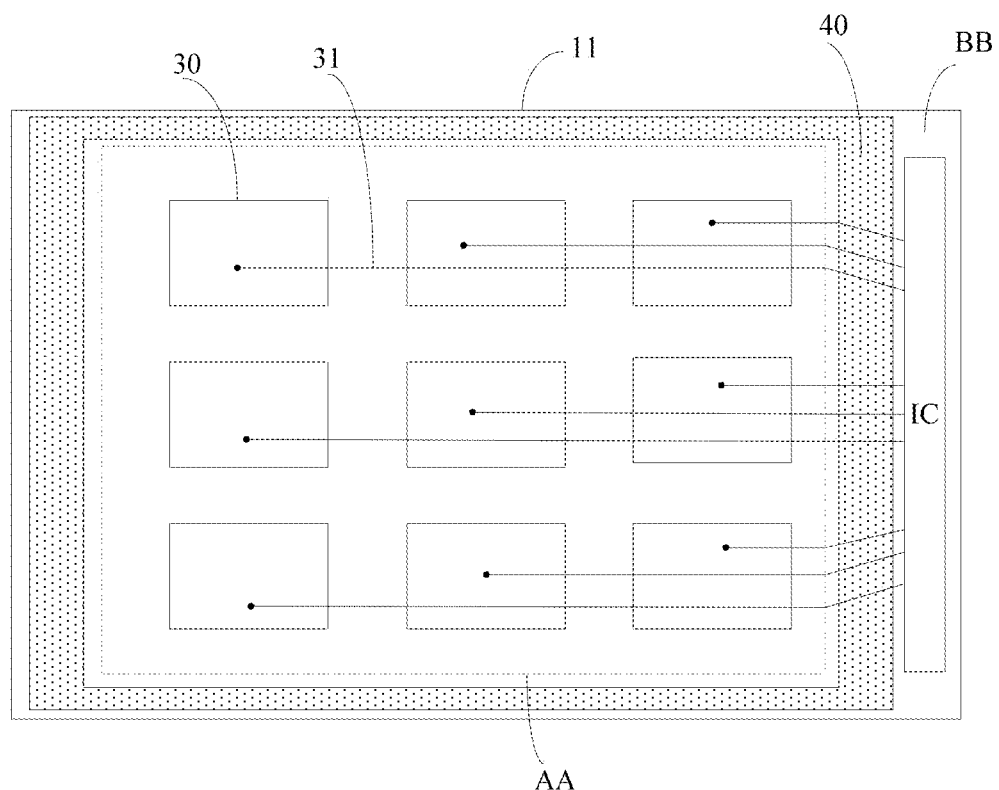
FIG. 9 is a structural diagram of a third shielding electrode in a touch display device provided in embodiments of the application.

In some embodiments, in the above-mentioned touch display device provided in the embodiment of the application, as shown in FIGS. 7 to 9, the first substrate 11 has a display area AA and a non-display area BB surrounding the display area AA. As shown in FIG. 7, the shielding electrode 40 may be provided in the display area AA, or as shown in FIGS. 8 and 9, may be provided in the bezel area BB, which is not limited here.

In some embodiments, in the application, as shown in FIG. 7, in the case where the shielding electrode 40 is made of a metal and the shielding electrode 40 is located in the display area AA, the shielding electrode 40 may be configured to be a grid structure, such that the display will not be affected.

Further, an orthographic projection of the shielding electrode of the grid structure on the first substrate is located within an orthographic projection of the black matrix on the first substrate. In this way, by providing the shielding electrode within the orthographic projection of the black matrix, an influence on the aperture ratio of pixels in the panel by the arrangement of the shielding electrode is avoided.

In some embodiments, to further prevent the arrangement of the shielding electrode from causing other defects in the liquid crystal display panel, in the above-mentioned touch display device provided in the embodiment of the application, as shown in FIG. 8, the shielding electrode 40 is located in the non-display area BB.

Further, in the application, as shown in FIG. 9, to increase the overlap area between the shielding electrode and the metal back plate 21, the shielding electrode 40 located in the non-display area BB surrounds the display area. That is, the shielding electrode 40 is in a ring shape that surrounds the display area AA.

Figure 10:
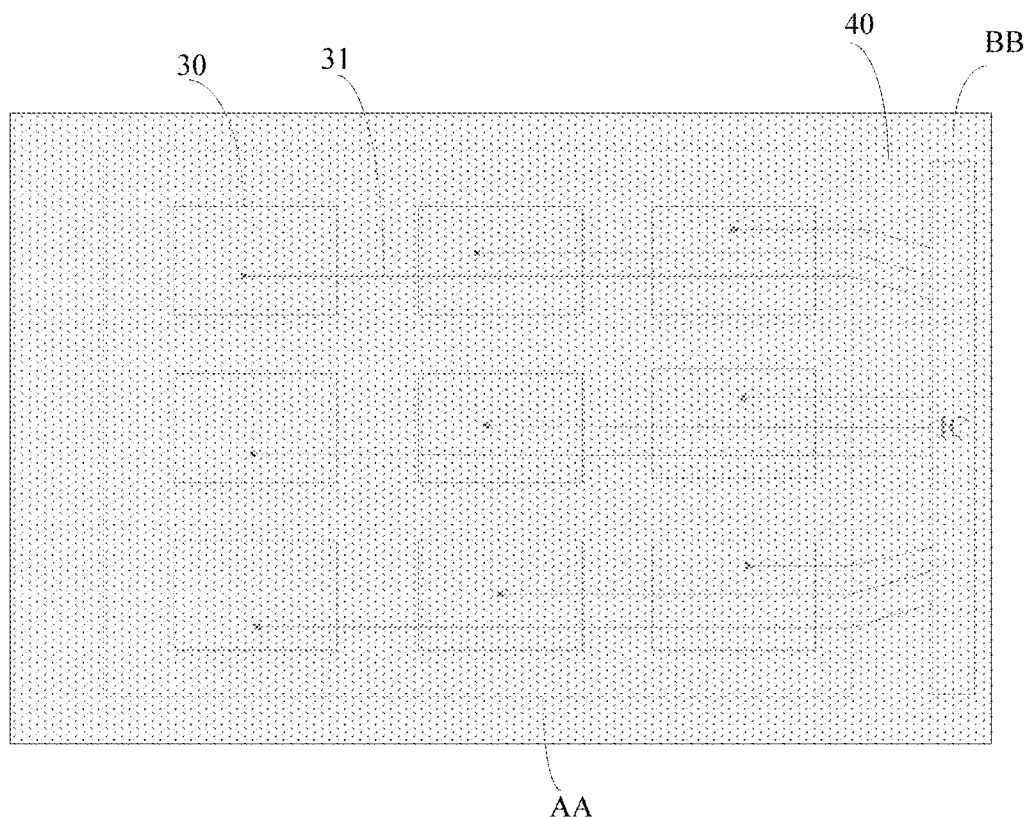
FIG. 10 is a structural diagram of a fourth shielding electrode in a touch display device provided in embodiments of the application.

In some embodiments, in the application, as shown in FIG. 10, to increase the overlap area between the shielding electrode and the metal back plate 21, the shielding electrode 40 is made of a transparent conductive material, and an orthographic projection of the shielding electrode 40 on the first substrate 11 covers the first substrate 11.

Alternatively, in some embodiments, in the application, the orthographic projection of the shielding electrode on the first substrate coincides with an orthographic projection of the metal back plate on the first substrate.

Figure 11:
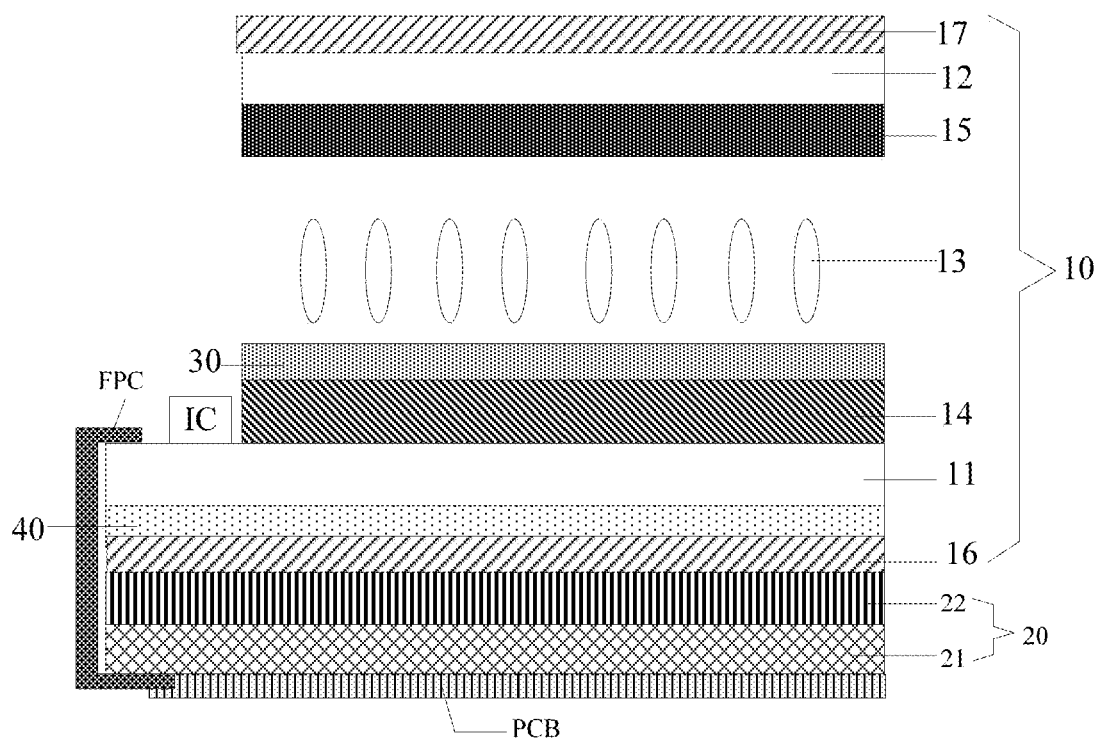
FIG. 11 is a structural diagram of a fourth touch display device provided in embodiments of the application.
Figure 12:
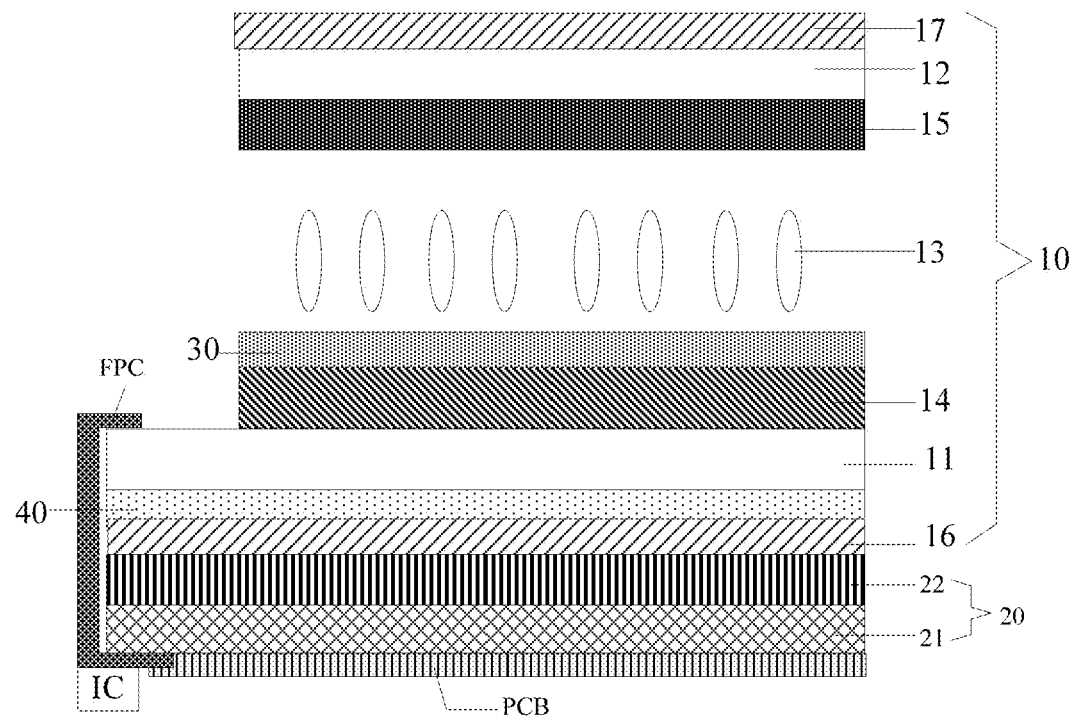
FIG. 12 is a structural diagram of a fifth touch display device provided in embodiments of the application.

The touch display panel provided by the application, as shown in FIGS. 11 and 12, further includes: a driver chip IC, a flexible circuit board FPC, and a printed circuit board PCB. The printed circuit board PCB is located on a side of the metal back plate 21 away from the liquid crystal display panel 10, and the printed circuit board PCB is electrically connected to the liquid crystal display panel through the flexible circuit board FPC. As shown in FIG. 11, the driver chip IC is located in the bezel area of the first substrate 11 to provide a drive signal to the display area, or as shown in FIG. 12, the driver chip IC may also be located on the flexible circuit board FPC.

In some embodiments, as shown in FIGS. 11 and 12, one end of the flexible circuit board FPC is bonded to the bezel area of the first substrate 11, and the other end thereof is bonded and connected to the printed circuit board PCB.

In some embodiments, in the application, the metal back plate is electrically connected to a ground signal terminal on the printed circuit board.

Figure 13:
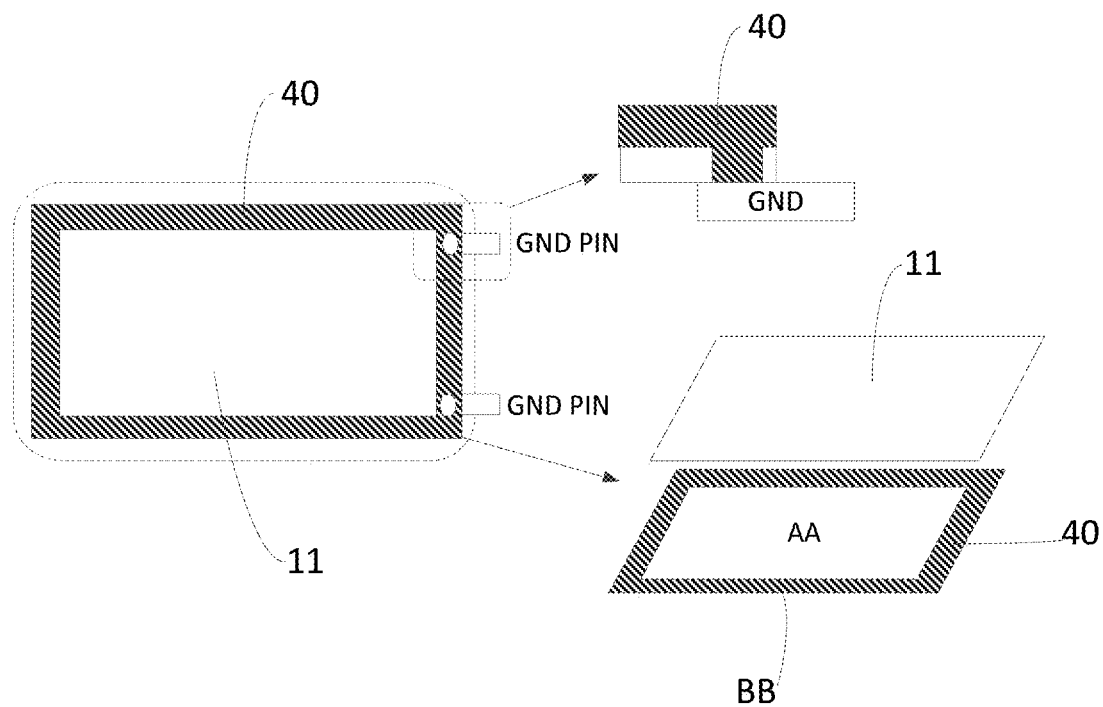
FIG. 13 is a structural diagram of a sixth touch display device provided in embodiments of the application.

In some embodiments, as shown in FIG. 13, the shielding electrode 40 may be electrically connected to a ground signal terminal GND PIN on the flexible circuit board FPC. Alternatively, in some embodiments, the shielding electrode may also be electrically connected to a ground signal terminal on the driver chip, which is not limited here.

Figure 14:
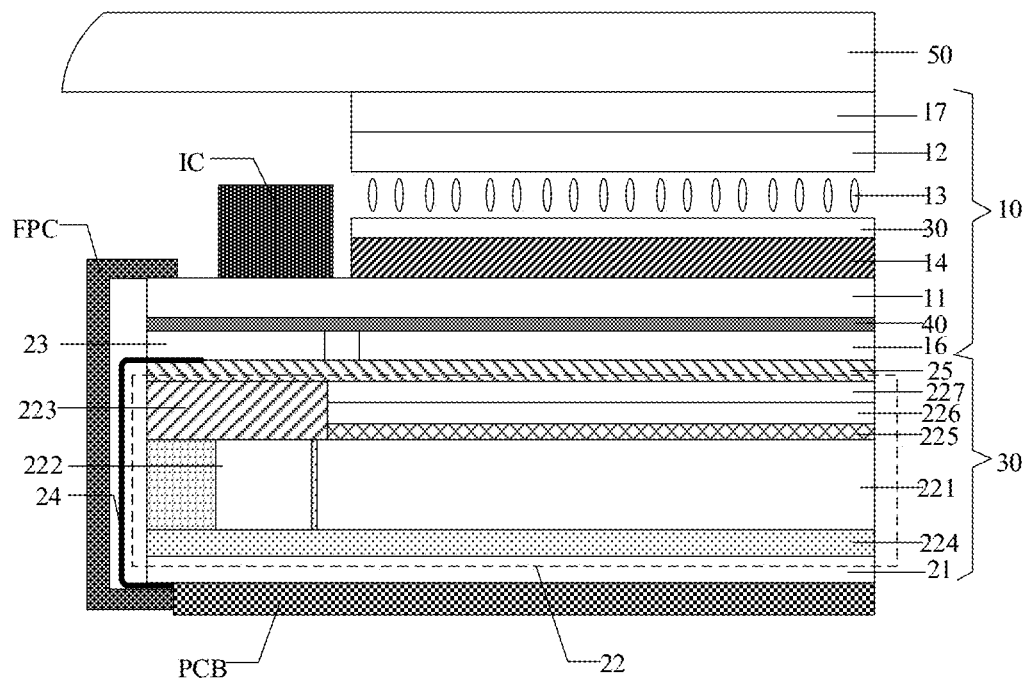
FIG. 14 is a structural diagram of a seventh touch display device provided in embodiments of the application.
Figure 15:
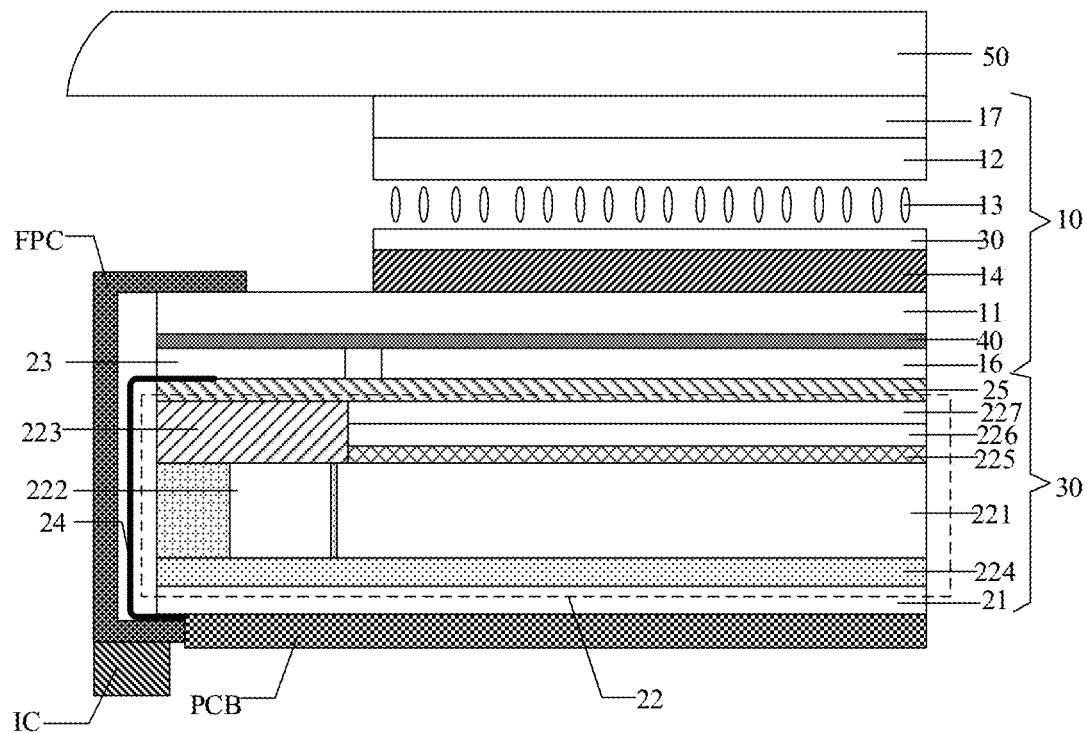
FIG. 15 is a structural diagram of an eighth touch display device provided in embodiments of the application.
Figure 16:
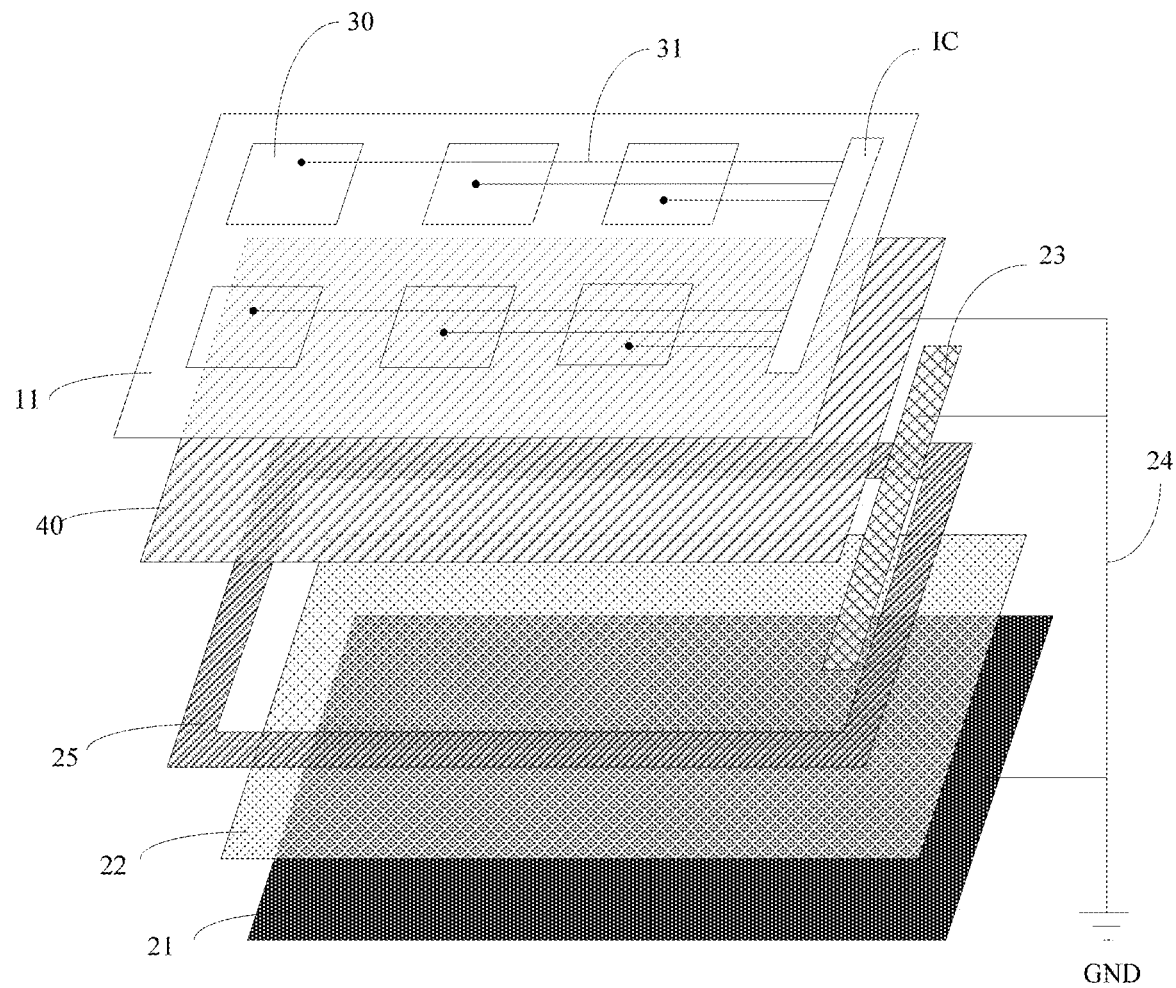
FIG. 16 is a structural diagram of a ninth touch display device provided in embodiments of the application.

In some embodiments, in the application, as shown in FIGS. 14 to 16, the shielding electrode 40 is located between the first substrate 11 and the first polarizer 16, and the shielding electrode 40 is grounded by being electrically connected to the metal back plate 21. In this way, the shielding electrode 40 is directly provided on the outer side of the substrate of the liquid crystal display panel without changing the arrangement of the internal film layers of the liquid crystal display panel, and the grounding operation is easy to implement by electrically connecting the shielding electrode 40 to the metal back plate 21.

In some embodiments, as shown in FIGS. 14 and 15, the backlight module 30 may include: the metal back plate 21, a backlight source 22 on a side of the metal back plate 21 facing the liquid crystal display panel 10, a conductive pad 23, and a flexible conductive tape 24. The metal back plate 21 supports the backlight source 22, The conductive pad 23 is located between the backlight source 22 and the shielding electrode 40 and in direct contact with the shielding electrode 40, and an orthographic projection of the conductive pad 23 on the first substrate 11 is located in the bezel area of the first substrate 11; and two ends of the flexible conductive tape 24 are directly in contact with the conductive pad 23 and the metal back plate 21, respectively.

In some embodiments, in the application, the flexible conductive tape may be a conductive mylar tape.

In some embodiments, in the application, the backlight source may be a direct-lit backlight source or an edge-lit backlight source, which is not limited here.

In some embodiments, using the backlight source being an edge-lit backlight source as an example, as shown in FIGS. 14 and 15, the backlight source 22 may include a backlight circuit board 223, a light guide plate 221, and an LED light source 222 at a lateral end of the light guide plate 221, a reflective layer 224 on a side of the light guide plate 221 facing the metal back plate 21, and a diffusion layer 225, a lower prism 226 and an upper prism 227 on a side of the light guide plate 221 away from the metal back plate 21. The light guide plate 221 is used to transmit light, and the diffusion layer 225 is used to diffuse light to ensure that the backlight module 20 provides a uniform and stable light source to the liquid crystal display panel 10.

Further, in the application, as shown in FIGS. 14 to 16, the backlight module 20 further includes a light shielding adhesive 25 on a side of the backlight source 22 facing the liquid crystal display panel 10, and the light shielding adhesive 25 is located in the bezel area. The conductive pad 23 is located between the light shielding adhesive 25 and the liquid crystal display panel 10, and the conductive pad 23 is located in a portion of the bezel area where the driver chip IC is provided.

Of course, in some embodiments, the backlight module further includes other functional devices well known to those skilled in the art, which will not be described in detail here.

In some embodiments, as shown in FIGS. 14 and 15, in the application, a protective cover plate 50 is also provided on a side of the liquid crystal display panel 10 away from the backlight module 20.

Figure 17:
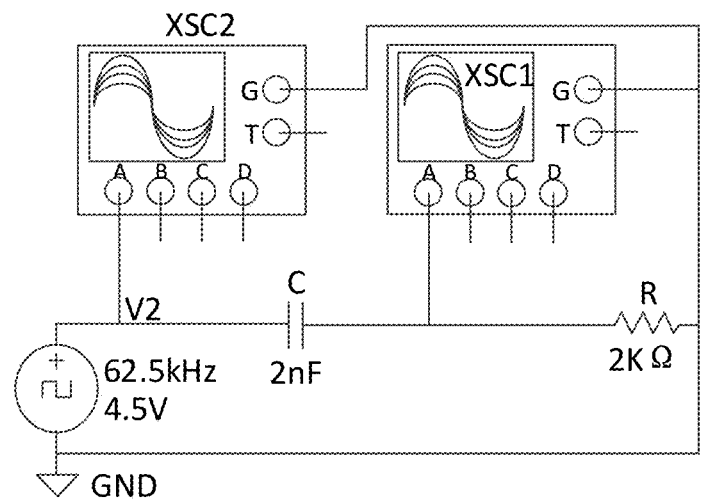
FIG. 17 is a simulation circuit diagram of a touch display device provided in embodiments of the application.
Figure 18:
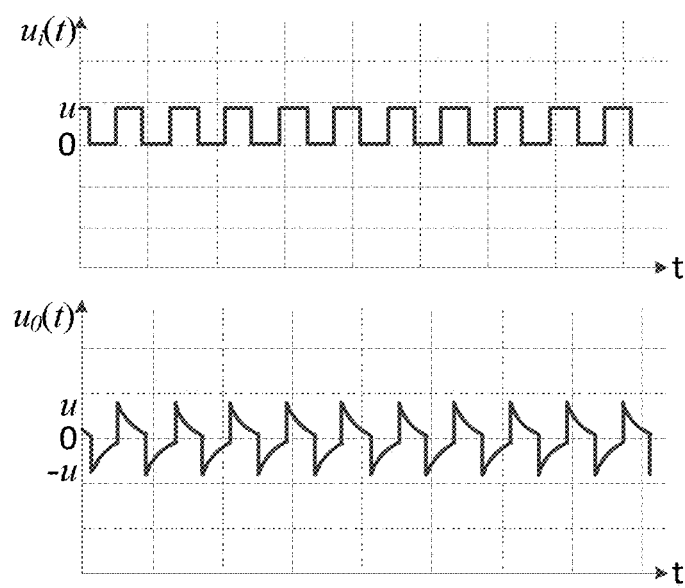
FIG. 18 is a waveform conversion diagram obtained by simulation using FIG. 17 in the application.

The following involves a simulation of the waveform after the shielding electrode and the metal back plate added to the touch display device provided in the embodiment of the application are grounded. In some embodiments, as shown in FIG. 17, XSC1 and XSC2 are oscilloscopes, XSC1 is a signal output terminal, and XSC2 is a touch signal input terminal, where the product of the capacitance value of the capacitor C and the resistance value of the shielding electrode is much smaller than the pulse width of the touch signals applied to the touch electrodes. The touch signals (rectangular square wave signals) as shown in FIG. 18 (upper graph) are applied to the touch electrodes by the oscilloscope XSC2, and after processing by the RC circuit, the oscilloscope XSC1 outputs a signal waveform as shown in FIG. 18 (lower graph). It can be seen that the output waveform is a waveform of positive and negative spike pulse signals. Thus, it can be seen that after the touch display device of the application is provided with the shielding electrode, the rectangular square wave signals on the touch electrodes can be converted into the positive and negative spike pulse signals on the shielding electrode. Equal amounts of positive and negative charges are induced between the shielding electrode and the metal back plate due to an effect of the electric field, and the positive and negative charges neutralize, which means that the charges induced by the electric field become 0. In this way, polarization is not liable to occur in the dielectric material film layer between the shielding electrode and the metal backing plate, an electrostriction condition is not met, mechanical vibration cannot be achieved, and thus the screaming problem can be effectively improved. The use effect of the product is improved.

The above-mentioned touch display device provided in the embodiment of the application may be a mobile phone, a tablet computer, a television, a display, a notebook computer, a digital photo frame, a navigator, or any other product or component with a display function.

It will be apparent to those skilled in the art that various modifications and variations can be made in the application without departing from the spirit or scope of the application. Thus, it is intended that the application covers the modifications and variations if these modifications and variations of the application come within the claims of the application and the scope of their equivalents.

What is claimed is:

1. A touch display device, comprising:
    a liquid crystal display panel;
    a touch electrode; and
    a backlight module on a light incident side of the liquid crystal display panel, the backlight module comprising a metal back plate;
    wherein
        the touch display device further comprises a shielding electrode on a side of the touch electrode facing the backlight module, both the shielding electrode and the metal back plate being grounded; and
        the touch electrode and the shielding electrode form a capacitor, and a product of a capacitance value of the capacitor and a resistance value of the shielding electrode is smaller than a pulse width of a touch signal applied to the touch electrode.

2. The touch display device of claim 1, wherein the product of the capacitance value of the capacitor and the resistance value of the shielding electrode is of an order of magnitude smaller than that of the pulse width of the touch signal.

3. The touch display device of claim 2, wherein the liquid crystal display panel comprises:
    a first substrate and a second substrate disposed opposite to each other; and
    a liquid crystal layer between the first substrate and the second substrate;
    wherein
        the backlight module is located on a side of the first substrate facing away from the second substrate;
        the touch electrode is located between the first substrate and the second substrate, or on a side of the second substrate away from the liquid crystal layer; and
        the shielding electrode is located on a side of the first substrate facing the liquid crystal layer, or on a side of the first substrate away from the liquid crystal layer.

4. The touch display device of claim 3, wherein the liquid crystal display panel further comprises:
    a thin film transistor array film layer on the side of the first substrate facing the liquid crystal layer, and a first polarizer on the side of the first substrate away from the liquid crystal layer;
    wherein
        the shielding electrode is located between the first substrate and the thin film transistor array film layer, or the shielding electrode is located between the first substrate and the first polarizer.

5. The touch display device of claim 4, further comprising:
    a driver chip;
    a flexible circuit board; and
    a printed circuit board;
    wherein
        the driver chip is on the first substrate or on the flexible circuit board;
        the printed circuit board is on a side of the metal back plate away from the liquid crystal display panel, and is electrically connected to the liquid crystal display panel through the flexible circuit board; and
        the metal back plate is electrically connected to a ground terminal on the printed circuit board.

6. The touch display device of claim 5, wherein:
    the shielding electrode is located between the first substrate and the thin film transistor array film layer; and
    the shielding electrode is electrically connected to the ground terminal on the flexible circuit board.

7. The touch display device of claim 5, wherein:
    the shielding electrode is located between the first substrate and the first polarizer; and
    the shielding electrode is grounded by being electrically connected to the metal back plate.

8. The touch display device of claim 7, wherein the backlight module further comprises a backlight source on a side of the metal back plate facing the liquid crystal display panel, conductive pad, and a flexible conductive tap,
    wherein:
        the metal back plate supports the backlight source;
        the conductive pad is located between the backlight source and the shielding electrode and in direct contact with the shielding electrode, and an orthographic projection of the conductive pad on the first substrate is located in a bezel area of the first substrate; and
        two ends of the flexible conductive tape are in direct contact with the conductive pad and the metal back plate, respectively.

9. The touch display device of claim 4, wherein the shielding electrode is made of a metal or transparent conductive material.

10. The touch display device of claim 3, wherein the shielding electrode is made of a metal or transparent conductive material.

11. The touch display device of claim 10, wherein the first substrate has a display area and a bezel area surrounding the display area, the shielding electrode being located in the display area, and the shielding electrode being of a grid structure.

12. The touch display device of claim 11, wherein the liquid crystal display panel further comprises a black matrix between the first substrate and the second substrate; and
    an orthographic projection of the shielding electrode on the first substrate is located within an orthographic projection of the black matrix on the first substrate.

13. The touch display device of claim 10, wherein the first substrate has a display area and a non-display area surrounding the display area, the shielding electrode being located in the non-display area and surrounding the display area.

14. The touch display device of claim 10, wherein the shielding electrode is made of a transparent conductive material, and an orthographic projection of the shielding electrode on the first substrate covers the first substrate.

* * * * *